United States Patent
Kim et al.

(10) Patent No.: US 10,374,265 B2
(45) Date of Patent: Aug. 6, 2019

(54) COMMUNICATION TERMINATING RESISTANCE AUTOMATIC SETTING METHOD OF ENERGY STORAGE SYSTEM

(71) Applicant: LG Chem, Ltd., Seoul (KR)

(72) Inventors: Duk Su Kim, Sejong-Si (KR); Jong Kook Lee, Daejeon (KR); Ho Soo Kim, Daejeon (KR); Sung Hyun Cho, Daejeon (KR); Geun Wook Lim, Daejeon (KR); Jong Doo Park, Daejeon (KR); Jin Seok Heo, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/922,460

(22) Filed: Mar. 15, 2018

(65) Prior Publication Data

US 2018/0269543 A1 Sep. 20, 2018

(30) Foreign Application Priority Data

Mar. 16, 2017 (KR) ........................ 10-2017-0033012

(51) Int. Cl.
| | | |
|---|---|---|
| *H02J 7/00* | (2006.01) | |
| *H01M 10/44* | (2006.01) | |
| *H01M 10/46* | (2006.01) | |
| *H01M 10/42* | (2006.01) | |
| *H04L 12/40* | (2006.01) | |

(52) U.S. Cl.
CPC ....... *H01M 10/441* (2013.01); *H01M 10/425* (2013.01); *H01M 10/46* (2013.01); *H02J 7/0004* (2013.01); *H04L 12/40* (2013.01); *H01M 2010/4271* (2013.01); *H02J 2007/0001* (2013.01); *H04L 2012/40215* (2013.01)

(58) Field of Classification Search
CPC ................. H01M 10/441; H02J 7/0004; H02J 2007/0001
USPC .......................................... 320/106, 116, 126
See application file for complete search history.

(56) References Cited

U.S. PATENT DOCUMENTS

| | | | | |
|---|---|---|---|---|
| 5,081,648 | A * | 1/1992 | Herzog ................. | H04L 5/1423 178/69 C |
| 5,355,391 | A * | 10/1994 | Horowitz ............ | G06F 13/4072 326/30 |
| 8,436,575 | B2 * | 5/2013 | Sim ...................... | H01M 10/482 320/106 |
| 8,504,748 | B2 * | 8/2013 | Matsuo ................. | H04L 12/403 710/110 |
| 8,547,065 | B2 * | 10/2013 | Trigiani ................ | H02J 7/0018 320/119 |

(Continued)

FOREIGN PATENT DOCUMENTS

| | | | | | |
|---|---|---|---|---|---|
| JP | 2015162803 | A | * | 9/2015 | ............. H04L 25/02 |
| KR | 20140060262 | A | * | 5/2014 | ............. G06F 13/42 |

(Continued)

*Primary Examiner* — Richard V Muralidar
(74) *Attorney, Agent, or Firm* — Lerner, David, Littenberg, Krumholz & Mentlik, LLP (57) ABSTRACT

The present invention relates to a method of automatically setting a communication resistance of an energy storage device (ESS), and more particularly, to a method of automatically controlling connection of a battery module and a terminating resistance by using a battery management system (BMS) ID allocated to each battery module constituting the ESS.

8 Claims, 4 Drawing Sheets

(56) References Cited

U.S. PATENT DOCUMENTS

| | | | | |
|---|---|---|---|---|
| 8,659,261 B2* | 2/2014 | Pariseau | ............ | B60L 11/1866 |
| | | | | 320/104 |
| 8,793,418 B2* | 7/2014 | Evans | ................ | G06F 13/4291 |
| | | | | 710/110 |
| 8,933,671 B2* | 1/2015 | Lee | .......................... | H04Q 9/00 |
| | | | | 320/135 |
| 9,024,584 B2* | 5/2015 | Park | ................. | H01M 10/4207 |
| | | | | 320/116 |
| 9,436,261 B2* | 9/2016 | Yun | ...................... | G06F 1/3212 |

FOREIGN PATENT DOCUMENTS

| | | | | |
|---|---|---|---|---|
| KR | 20160041260 A | * | 4/2016 | ............ H04L 12/28 |
| KR | 20160130417 A | * | 11/2016 | ............... G06F 1/26 |
| KR | 2017-51071 A | | 5/2017 | |

\* cited by examiner

FIG. 1

PRIOR ART

COMMUNICATION TERMINATING RESISTANCE AUTOMATIC SETTING METHOD OF ENERGY STORAGE SYSTEM

CROSS-REFERENCE TO RELATED APPLICATION

This application claims priority to Korean Patent Application No. 10-2017-0033012 filed on Mar. 16, 2017 and all the benefits accruing therefrom under 35 U.S.C. § 119, the contents of which are incorporated by reference in their entirety.

BACKGROUND

The present invention relates to a method of automatically setting a communication resistance of an energy storage device (ESS), and more particularly, to a method of automatically controlling connection of a battery module and a terminating resistance by using a battery management system (BMS) ID allocated to each battery module constituting the ESS.

An Energy Storage System (ESS) is a device for storing the generated electricity in a storage device such as a battery and supplying it when power is needed to improve the efficiency of power use. The ESS is used in conjunction with an uninterruptible power supply (UPS) that provides stable power supply in response to abrupt power supply interruptions or abnormalities and a photovoltaic (PV) system that converts sunlight into electric energy. For example, a stand-alone ESS in the ESS is used in conjunction with an UPS in a communication repeater or a PV system for home.

Meanwhile, in order to use the ESS in conjunction with a UPS in a communication repeater or a PV system for home, it is important that an upper charge/discharge device in the ESS stably controls a plurality of battery modules. In order for the upper charge/discharge device to operate the ESS stably, smooth communication between the upper charge/discharge device and the ESS is essential. Therefore, for communication between the upper charge/discharge device and the ESS, terminating resistance is required. When the communication cable for communication is connected, for example, when a high frequency signal is transmitted to the communication cable while the end terminal is cut off, since the original signal is mixed with the reflected signal from the cut surface, there is a difficulty in reading the correct signal. That is, such a phenomenon hinders smooth communication between connected mutual devices. Therefore, the terminating resistance is an important factor for smooth communication between the upper charge/discharge device and the ESS by preventing the phenomenon.

A conventional terminating resistance connecting method uses a method in which a person connects directly a jumper wire to the end terminal of a communication (transmission) cable. However, when using the above-described conventional method, since a person directly inserts a terminating resistance, a mistake such as insertion into a wrong position or no insertion of a terminating resistance may occur. In addition, at the time of inserting, the possibility of a physical failure of a terminating resistance, for example, a change in resistance value due to shorting of both ends of a resistance may not be excluded.

SUMMARY

The present invention provides a method for controlling the connection between a battery module and a terminating resistance by using an ID allocation method of a battery module (refer to Korean Patent Application No. 10-2015-0153419), rather than a method in which a person directly inserts a terminating resistance directly.

In accordance with an exemplary embodiment, a connection system of a battery module and a terminating resistance of an energy storage system (ESS) including a plurality of battery modules includes: a master battery management system (BMS) configured to allocate IDs to a plurality of slave modules connected to a master module, calculate the number of all the battery modules through this, and transmit the number to the respective slave modules; a slave BMS configured to compare whether the number of all the battery modules received from the master BMS matches the allocated corresponding ID; a first terminating resistance connected to the lowest slave BMS included in the slave module connected to the lowest one of the plurality of slave modules; and a control unit configured to compare whether the number of all the battery modules matches a corresponding ID and output a connection control signal for controlling a connection of the lowest slave BMS and the first terminating resistance according to a comparison result.

The comparing of whether the number of all the battery modules matches the corresponding ID may be performed by the lowest slave BMS.

The connection system may further include a connection switch for connecting or disconnecting the connection between the lowest slave BMS and the first terminating resistance according to a control signal outputted from the control unit.

The control unit may output an ON signal for connecting the lowest slave BMS and the first terminating resistance to a connection switch if it is determined that the number of all the battery modules received from the master BMS in the slave BMS matches the allocated corresponding ID and may output an OFF signal for disconnecting the connection between the lowest slave BMS and the first terminating resistance to the connection switch if it is determined that the number of all the battery modules received from the master BMS in the slave BMS does not match the allocated corresponding ID.

The connection system may further include a second terminating resistance configured in an upper charge/discharge device for controlling the entire battery module to communicatively connect the upper charge/discharge device and the master BMS.

In accordance with another exemplary embodiment, a method of connecting a battery module and a terminating resistance in an ESS including a plurality of battery modules includes: an ID allocation operation for receiving an allocated corresponding ID from a master BMS connected to a second terminating resistance configured in an upper charge/discharge device; a module number reception operation for receiving the number of all the battery modules calculated through ID allocation, from the master BMS; a matching comparison operation for comparing whether the number of all the battery modules received in the module number reception operation matches the allocated corresponding ID; and a first terminating resistance connection control operation for controlling a connection between a lowest slave BMS connected to the lowest one of the plurality of slave BMSs connected to the master BMS and a first terminating resistance connected to the lowest slave BMS according to the comparison result in the matching comparison operation.

The matching comparison operation may be performed by the lowest slave BMS connected to the lowest one among the plurality of slave BMSs connected to the master module.

The first terminating resistance connection control operation may control the lowest BMS and the first terminating resistance to be connected if the number of all the battery modules performed in the matching comparison operation matches an allocated corresponding ID, and may control the lowest BMS and the first terminating resistance to be disconnected if the number of all the battery modules performed in the matching comparison operation does not match the allocated corresponding ID.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, embodiments of the present invention will be described in detail with reference to the accompanying drawings so that those skilled in the art can easily carry out the present invention. The present invention may, however, be embodied in different forms and should not be construed as limited to the embodiments set forth herein. Parts not relating to description are omitted in the drawings in order to clearly describe the present invention and like reference numerals refer to like elements throughout.

Although the terms "first," "second," etc., may be used herein to describe various elements, these elements should not be limited by these terms. The above terms are used only to distinguish one component from another. For example, a first component may be referred to as a second component and vice versa without departing from the scope of the present invention. Terms used in this specification are used to describe specific embodiments, and are not intended to limit the scope of the present invention. The singular expressions include plural expressions unless the context clearly dictates otherwise. Throughout the specification, when a portion is referred to as being "connected" to another portion, it includes not only "directly connected" but also "electrically connected" with another element therebetween. Furthermore, when it is described that one comprises (or includes or has) some elements, it should be understood that it may comprise (or include or has) only those elements, or it may comprise (or include or have) other elements as well as those elements if there is no specific limitation. The term "~ing operation" or "operation of ~ing" used throughout the specification does not mean "operation for ~ing".

Terms used in this specification may be currently widely used general terms in consideration of functions in the present invention but may vary according to the intents of those skilled in the art, precedents, or the advent of new technology. Additionally, in certain cases, there may be terms the applicant selects arbitrarily and in this case, their meanings are described in a corresponding description part of the present invention. Accordingly, terms used in the present invention should be defined based on the meaning of the term and the entire contents of the present invention instead of the simple term name.

The connection system of the battery module and the terminating resistance included in the energy storage device (ESS) includes: a master battery management system (BMS) for allocating IDs to a plurality of slave modules connected to the master module, respectively, calculating the number of all the battery modules through the IDs, and transmitting it to the respective slave modules; a slave BMS for comparing the number of all the battery modules received from the master BMS with the allocated corresponding ID; a first terminating resistance connected to the lowest slave BMS included in the slave module connected to the lowest one of the plurality of slave modules; and a control unit for outputting a connection control signal for controlling the communication connection between the lowest slave BMS and the first terminating resistance according to whether the number of all the battery modules matches the corresponding IDs. It includes a second terminating resistance configured in an upper charge/discharge device for controlling the entire battery module and for connecting the communication between the upper charge/discharge device and the master BMS.

Hereinafter, a detailed description will be given with reference to the drawings.

In the present invention, the second terminating resistance and the master BMS, and the lowest slave BMS connected to the lowest one of the slave BMS and the first terminating resistance in the upper charge/discharge device are communicatively connected through CAN communication (a: CAN High, b: CAN Low), for example. That is, the upper charge/discharge device and the entire battery module may be communicatively connected through the CAN communication (a: CAN High, b: CAN Low). (see FIG. 2).

Also, the connection between each battery module is communicatively connected, for example, via CAN communication (c: CAN High, d: CAN Low). That is, the communication connection between the upper charge/discharge device and the battery module and the communication connection between each battery module may be separately configured. (see FIG. 2).

Figure 1:
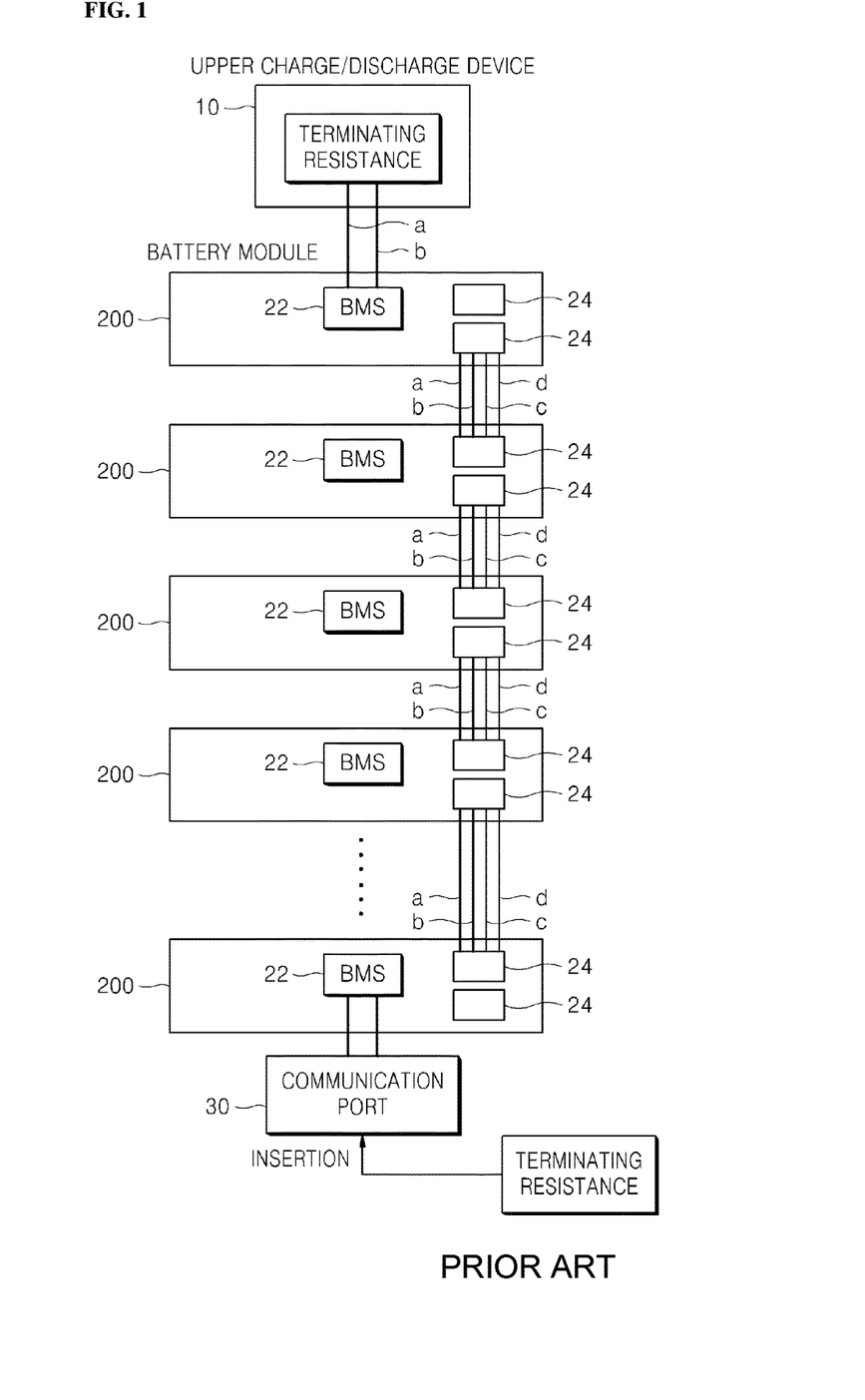
FIG. 1 is a view schematically showing a method of connecting a conventional battery module with a terminating resistance.

FIG. 1 is a view schematically showing a method of connecting a conventional battery module with a terminating resistance. Referring to FIG. 1, in order to explain a connection method of a plurality of battery modules and a terminating resistance included in the conventional ESS, a configuration including an upper charge/discharge device 10, a plurality of battery modules 20, a battery management system 22 included in each battery module, a communication connector 24, and a communication port 30 may be described.

In order for the upper charge/discharge device 10 to stably operate the plurality of battery modules 20, communication between the upper charge/discharge device 10 and the plurality of battery modules 20 is essential. Here, the upper charge/discharge device 10 may be, for example, an inverter or a rectifier. Thus, the terminating resistance serves to perform communication connection for communication between the upper charge/discharge device 10 and the plurality of battery modules 20. The terminating resistance is connected to the upper charge/discharge device 10 and the last of the plurality of battery modules, respectively. That is, as the upper charge/discharge device 10 is connected to the start point of a communication line to which the master module, that is, an upper battery module among modules, is connected, and is connected to the end point of the communication line which is connected to the last one of the battery modules, through the terminating resistance connected to the start point of the communication line and the terminating resistance connected to the end point, the upper charge/discharge device 10 and the plurality of battery modules 20 are communicatively connected.

Here, in order to connect the terminating resistance to the end point, it is physically inserted and connected by, for example, a user (battery installer). Specifically, after connecting a communication port, for example, to a last battery module among a plurality of battery modules, a terminating resistance is physically inserted and connected by a person through the communication port.

Since this method physically performs insertion/connection from outside by a person, it is impossible to exclude the possibility of a problem caused by a person, and the problem may include that it may be inserted in the wrong position and both ends of the terminating resistance are shorted.

Therefore, in order to solve the problem of connecting the terminating resistance to the conventional battery module, the present invention provides a method for automatically connecting a terminating resistance according to a predetermined standard.

Figure 2:
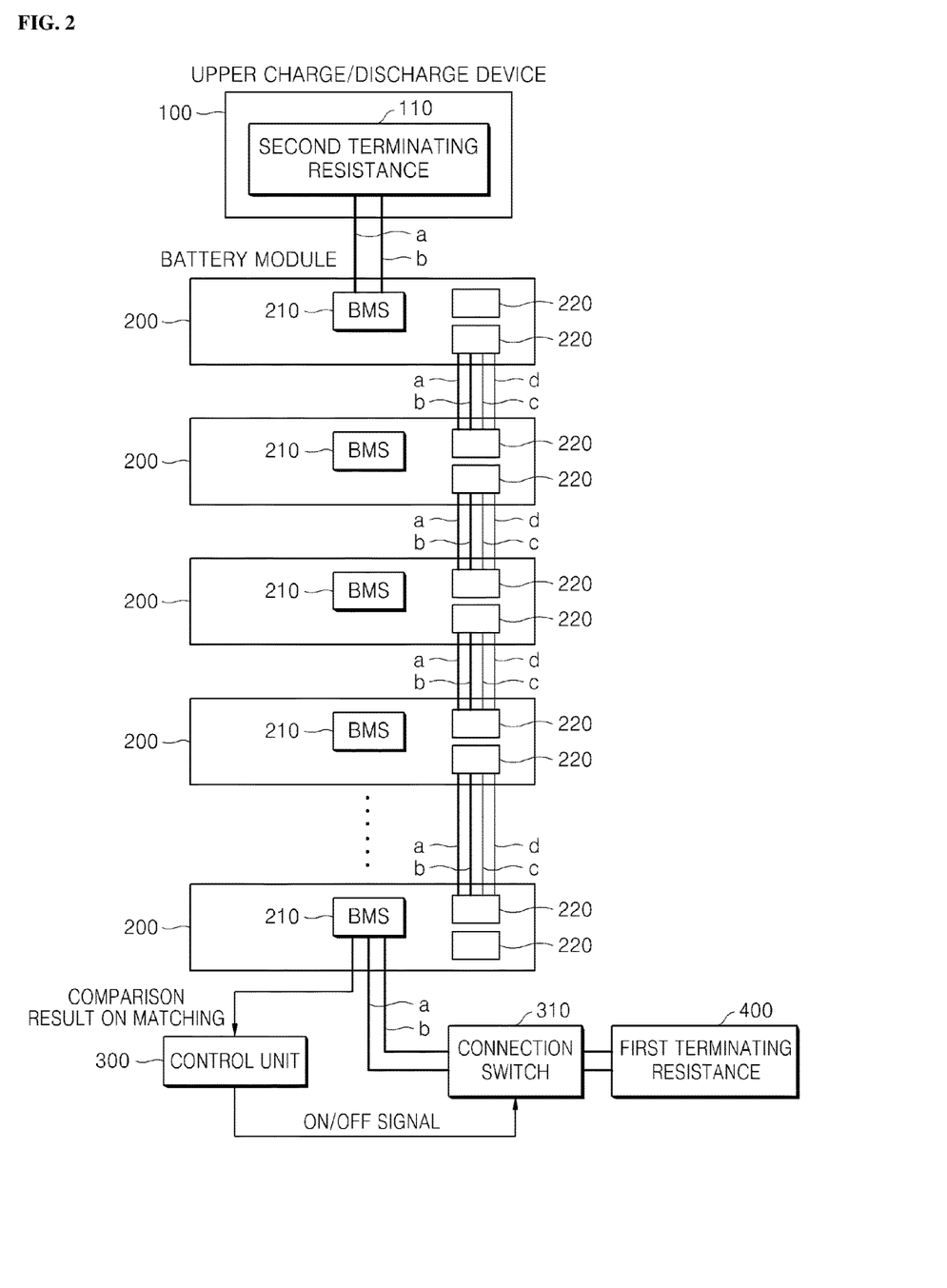
FIG. 2 illustrates a system for connecting a battery module and a terminating resistance according to the present invention.

FIG. 2 illustrates a system for connecting a battery module and a terminating resistance according to the present invention. Referring to FIG. 2, the ESS includes an upper charge/discharge device 100, a plurality of battery modules 200, a BMS 210 and a communication connector 220 included in each battery module, a second terminating resistance 110, a control unit 300, a connection switch 310, and a first terminating resistance 400.

The upper charge/discharge device 100 may be, for example, an inverter or a rectifier. The upper charge/discharge device 100 may communicate with a plurality of battery modules 200 through the first terminating resistance 400 and the second terminating resistance 110. Accordingly, the upper charge/discharge device 100 may control the entire battery module to operate stably.

The plurality of battery modules 200 may include a master module slave module, and the master BMS, which is the battery management system of the master module, may allocate an ID to each slave BMS. A manner in which the master BMS including the master module and the slave mode allocates the ID to each slave BMS uses the ID allocation scheme of the patent No. 10-2015-0153419. More specifically, power is applied to the BMS of one of the plurality of battery modules to set the first BMS, and after transmitting the ID allocation request signal through the CAN node in the first BMS, when a predetermined wait time is awaited and an ID allocation signal is received within the predetermined waiting time, it is determined that a predetermined master BMS exists, and if an ID allocation signal is not received in the first BMS for a predetermined waiting time, it is determined that that the predetermined master BMS does not exist, thereby setting the first BMS that requests the ID allocation to be the master BMS.

In addition, the master BMS set through the above-described method allocates respective IDs to the plurality of slave BMSs connected to the master BMS. Each slave BMS transmits an ID allocation request signal to the master BMS via the CAN node in order to receive an ID from the master BMS. The master BMS allocates sequentially generated IDs to the respective slave BMSs according to the order of the ID allocation request signals transmitted through the CAN node in each slave BMS. In this way, the master BMS may allocate an ID to the entire slave BMS connected to the master BMS.

After allocating an ID to the entire battery module through the ID allocation method, the master BMS may calculate the total number of battery modules by using the ID allocated to each slave BMS.

The method of calculating the total number of battery modules using the allocated ID may perform calculation by determining the largest value among all the allocated IDs as a number. For example, if the ID of the master BMS is n, the ID of the low slave BMS directly connected to the master BMS is n+1. Also, the ID of the low slave BMS connected to the (n+1) slave BMS may be n+2. Therefore, since the number of IDs allocated to the slave BMSs is increased by 1 as much as the number of connected battery modules, the total number of battery modules connected through the communication connector of each battery module may be calculated as the largest value among the IDs allocated by the master BMS.

The master BMS that calculates the total number of battery modules through the above-described method may transmit the calculated total number of battery modules to each slave BMS. Accordingly, the slave BMS may receive the total number of battery modules. The lowest slave BMS connected to the lowest one of the slave BMSs receiving the total number of battery modules may compare whether the number of all the battery modules matches the corresponding ID of the user. After comparing the number of all the battery modules with the corresponding ID of the user, the comparison result may be transmitted to the control unit 300.

Based on the comparison result between the number of all the battery modules received from the lowest slave BMS and the corresponding ID, the control unit 300 may output a control signal to a connection switch for controlling the connection between the lowest slave BMS and the first terminating resistance 400.

For example, if the number of all the battery modules matches the corresponding ID of the lowest BMS, the control unit 300 may output an ON signal to the connection switch 310.

Accordingly, the connection switch 310 receiving the ON signal is turned on, so that the lowest slave BMS and the first terminating resistance 400 may be connected. Thus, the connection of the lowest slave BMS to the first terminating resistance 400 may mean that the first terminating resistance 400 and the second terminating resistance 110 are communicatively connected. Therefore, the communication between the upper charge/discharge device 100 and the entire battery module 200 is smoothly performed through the first terminating resistance 400 and the second terminating resistance 110, so that the upper layer discharge device 100 may control the entire battery module 200 to be operated stably.

On the other hand, if the number of all the battery modules does not match the corresponding ID of the lowest BMS, the control unit 300 may output an OFF signal to the connection switch 310.

Figure 4:
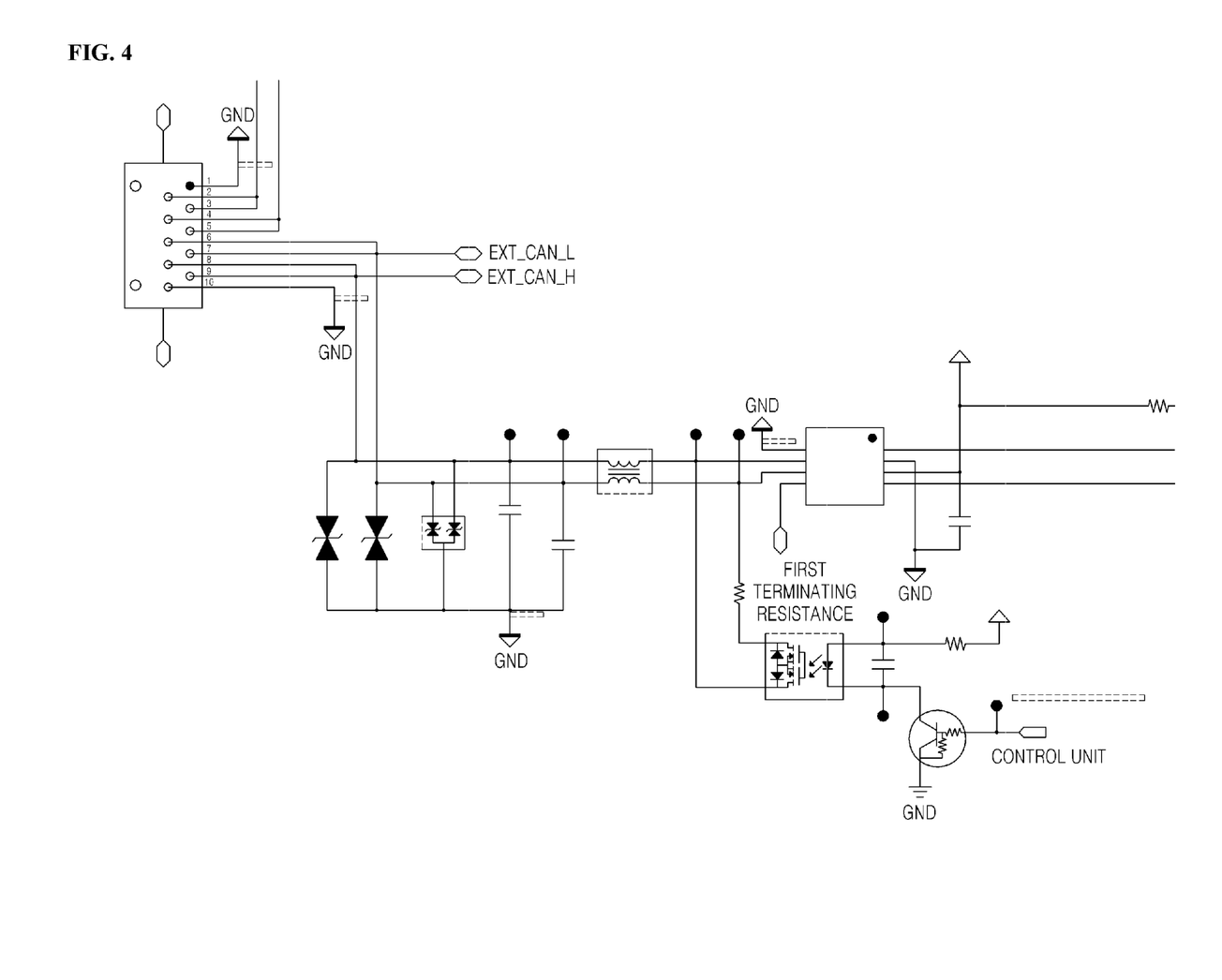
FIG. 4 is a diagram showing an example of a terminating resistance connection circuit according to the present invention.

Therefore, the connection switch 310 receiving the OFF signal is turned off, thereby blocking the connection between the lowest slave BMS and the first terminating resistance. Here, the fact that the corresponding ID of the lowest slave BMS does not match the total number of battery modules means that the IDs are not allocated to each slave BMS or there is a part where connection among all the battery modules is not normally performed. Accordingly, such a situation may be that it is determined that it is impossible to stably control the entire battery module 200 such that the connection of the first slave BMS and the first terminating resistance 400 is disconnected. (see FIG. 4).

By using the connection method of the lowest slave BMS and the first terminating resistance 400, it is possible to provide more improved stability than the conventional terminating resistance connection method.

Figure 3:
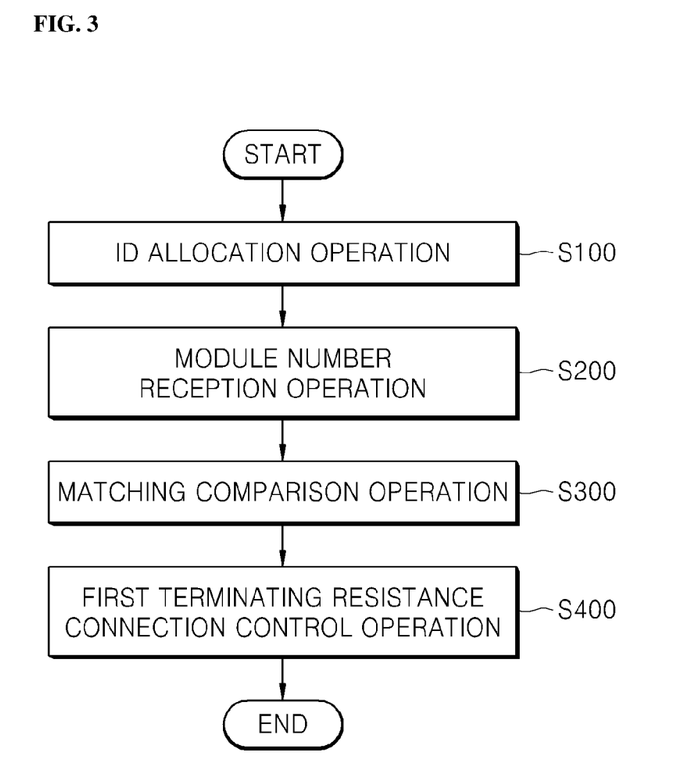
FIG. 3 is a block diagram illustrating a method of connecting a battery module and a terminating resistance according to the present invention.

FIG. 3 is a block diagram illustrating a method of connecting a battery module and a terminating resistance according to the present invention.

Referring to FIG. 3, an ID allocation operation S100, a module number reception operation S200, a matching comparison operation S300, and a first terminating resistance connection control operation S400 may be included.

The ID allocation operation S100 is an operation of receiving an allocated corresponding ID from the master BMS connected to the second terminating resistance configured in the upper charge/discharge device 100, respectively. Each slave BMS transmits an ID allocation request signal to the master BMS via the CAN node in order to receive an ID from the master BMS. The master BMS receiving the ID allocation request signal from each slave BMS via the CAN node between the master BMS and the slave BMS, sequentially generates each corresponding ID according to the order of the received ID allocation request signal and allocates the generated ID to each slave BMS. In this manner, a plurality of slave BMSs connected to the master BMS may receive each allocated corresponding ID from the master BMS. (See Patent No. 10-2015-0153419)

The module number reception operation S200 is an operation of receiving the total number of battery modules calculated through ID allocation from the master BMS. The master BMS may calculate the total number of battery modules based on the IDs allocated to the respective slave BMSs.

The calculation of the total number of modules may be performed by determining the largest value among all the allocated IDs as a number, for example. For example, if the ID of the master BMS is n, the ID of the low slave BMS directly connected to the master BMS is n+1. Also, the ID of the low slave BMS connected to the (n+1) slave BMS may be n+2. Therefore, the ID allocated to the corresponding slave BMS by the number of connected battery modules may be calculated as the largest value among the IDs allocated to increase by 1.

The master BMS that calculates the total number of battery modules through the above-described method may transmit the calculated total number of battery modules to each slave BMS. Thus, each slave BMS may receive the total number of battery modules from the master BMS.

The matching comparison operation S300 compares the number of all the battery modules received in the module number reception operation S200 with the corresponding ID of the slave BMS. The matching comparison operation S300 is performed by the lowest slave BMS connected to the lowest among the plurality of slave BMSs connected to the master BMS. The lowest slave BMS may compare the number of all the battery modules received from the master BMS with the corresponding ID of the user through the module number reception operation S200.

Here, for example, when the number of all the battery modules matches the corresponding ID, it means that all the battery modules are normally connected and the IDs are allocated to all the battery modules. On the other hand, if the number of all the battery modules and the corresponding ID do not match, it means that there is a part that is not normally connected during the connection between all the battery modules, so that no ID is allocated to all the battery modules.

The first terminating resistance connection control operation S400 may be an operation for controlling the connection of the lowest slave BMS and the first terminating resistance based on the comparison result obtained by comparing whether the number of all the battery modules matches the corresponding ID of the lowest slave BMS performed in the matching comparison operation S300.

For example, if the number of all the battery modules matches the corresponding ID of the lowest slave BMS, the lowest slave BMS and the first terminating resistance may be controlled to be connected. Here, controlling the connection of the lowest slave BMS and the first terminating resistance may be controlled by, for example, configuring the connection switch 310 between the lowest slave BMS and the first terminating resistance. Therefore, if the number of all the battery modules matches the ID of the lowest slave BMS as described above, an On signal may be outputted to the connection switch. That is, when the connection switch receiving the On signal is turned on, the lowest slave BMS and the first terminating resistance may be connected.

On the other hand, if the number of all the battery modules and the corresponding ID of the lowest slave BMS do not match, the connection between the lowest slave BMS and the first terminating resistance may be blocked. In this case, by outputting an Off signal to the connection switch, the connection switch is turned off to cut off the connection between the lowest slave BMS and the first terminating resistance. (see FIG. 4).

In such a way, as the number of all the battery modules matches the corresponding ID of the lowest slave BMS, the connection of the lowest slave BMS connected to the lowest of all the battery modules and the first terminating resistance may mean that the first terminating resistance 400 and the second terminating resistance 110 are communicatively communicated through the CAN communication a and b, for example.

Therefore, the communication between the upper charge/discharge device 100 and the entire battery module 200 is smoothly performed through the first terminating resistance 400 and the second terminating resistance 110, so that the upper layer discharge device 100 may control the entire battery module 200 to be operated stably.

The present invention may design a circuit to automatically set a terminating resistance according to a predetermined criteria in a non-human system, thereby reducing the unnecessary mistakes that may occur by physically setting it as in the conventional manner to improve accuracy and efficiency. In addition, since the accuracy of the terminating resistance setting is improved, a smooth communication connection may be provided, and more stable inter-device operation may be achieved.

Although the ESS has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. A connection system of a battery module and a terminating resistance of an energy storage system (ESS) including a plurality of battery modules, the connection system comprising:
    a master battery management system (BMS) configured to allocate IDs to a plurality of slave modules connected to a master module, calculate the number of all the battery modules through this, and transmit the number to the respective slave modules;

a slave BMS configured to compare whether the number of all the battery modules received from the master BMS matches the allocated corresponding ID;

a first terminating resistance connected to the lowest slave BMS included in the slave module connected to the lowest one of the plurality of slave modules; and a control unit configured to compare whether the number of all the battery modules matches a corresponding ID and output a connection control signal for controlling a connection of the lowest slave BMS and the first terminating resistance according to a comparison result.

2. The connection system of claim 1, wherein the comparing of whether the number of all the battery modules matches the corresponding ID is performed by the lowest slave BMS.

3. The connection system of claim 1, further comprising a connection switch for connecting or disconnecting the connection between the lowest slave BMS and the first terminating resistance according to a control signal outputted from the control unit.

4. The connection system of claim 3, wherein the control unit outputs an ON signal for connecting the lowest slave BMS and the first terminating resistance to a connection switch if it is determined that the number of all the battery modules received from the master BMS in the slave BMS matches the allocated corresponding ID and outputs an OFF signal for disconnecting the connection between the lowest slave BMS and the first terminating resistance to the connection switch if it is determined that the number of all the battery modules received from the master BMS in the slave BMS does not match the allocated corresponding ID.

5. The connection system of claim 1, further comprising a second terminating resistance configured in an upper charge/discharge device for controlling the entire battery module to communicatively connect the upper charge/discharge device and the master BMS.

6. A method of connecting a battery module and a terminating resistance in an ESS including a plurality of battery modules, the method comprising:

an ID allocation operation for receiving an allocated corresponding ID from a master BMS connected to a second terminating resistance configured in an upper charge/discharge device;

a module number reception operation for receiving the number of all the battery modules calculated through ID allocation, from the master BMS;

a matching comparison operation for comparing whether the number of all the battery modules received in the module number reception operation matches the allocated corresponding ID; and a first terminating resistance connection control operation for controlling a connection between a lowest slave BMS connected to the lowest one of the plurality of slave BMSs connected to the master BMS and a first terminating resistance connected to the lowest slave BMS according to the comparison result in the matching comparison operation.

7. The method of claim 6, wherein the matching comparison operation is performed by the lowest slave BMS connected to the lowest one among the plurality of slave BMSs connected to the master module.

8. The method of claim 6, wherein the first terminating resistance connection control operation controls the lowest BMS and the first terminating resistance to be connected if the number of all the battery modules performed in the matching comparison operation matches an allocated corresponding ID, and controls the lowest BMS and the first terminating resistance to be disconnected if the number of all the battery modules performed in the matching comparison operation does not match the allocated corresponding ID.

* * * * *